United States Patent Office 3,155,733
Patented Nov. 3, 1964

3,155,733
ARYLOXYARYLTHIOALKENYL ETHERS
Walter Reifschneider, Midland, Mich., assignor to The Dow Chemical Company, Midland, Mich., a corporation of Delaware
No Drawing. Filed June 27, 1962, Ser. No. 205,522
3 Claims. (Cl. 260—609)

The present invention is directed to thioethers and in particular is directed to novel thioethers corresponding to the formula

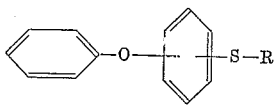

In the present specification and claims, R represents an alkenyl group being of from 2 to 12, inclusive, carbon atoms.

The novel compounds are colorless oils or crystalline solids appearing white in mass, very slightly soluble in water but readily soluble in various common organic solvents such as lower alkanols, acetone, benzene and the like. The compounds are useful as insecticides and herbicides, various of them have distinct anthelmintic activity: they are of low inherent toxicity to warm-blooded animals. The compounds are useful as intermediates in the preparation of resins, dyestuffs and biologically active phosphate materials.

The compounds are prepared by a process which comprises the step of causing a reaction between an aromatic thiol compound corresponding to the formula

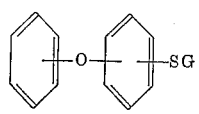

wherein G represents hydrogen, alkali metal, or copper (I), and an alkenyl halide corresponding to the formula

X—R

During the reaction to prepare the present compounds, one molecule of aromatic thiol reacts with each molecule of alkenyl halide. Small amounts of either substance may be lost in side reactions. Thus, when it is desired to prepare the present compound in a high state of purity and with a minimum of necessary post-synthesis purification procedure, the starting reactants should be employed in approximately equimolecular proportions. However, other proportions may be employed if desired, and unconsumed starting material of whatever identity may, if desired, be recycled into further synthesis process.

The reaction goes forward at temperatures over a wide range, such as from 30° to 350° C., but initiates most readily when heated to a temperature somewhat higher than room temperature. A preferred range is from 80 to 250° C. Under these conditions the reaction is, in general, exothermic and goes forward to completion with good yield calculated upon the basis of consumed starting material. Hydrogen halide of reaction is evolved and means for its orderly disposal are advantageously provided.

Tendency of the ethylenically unsaturated moiety to polymerize is not usually troublesome although when desired the present products can be polymerized. To assure freedom from undesired polymerization, a conventional polymerization inhibitor such as hydroquinone can be added to the unsaturated reactant or to the reaction mixture. If it be desired thereafter to polymerize a product of the present invention a peroxide catalyst can be used with good results: it overcomes the inhibitory action of the hydroquinone. Benzoyl peroxide is such catalyst.

Typically, in the preparation of the compounds of the present invention, reaction between the thiol starting material and the halide starting material will initiate and go forward in the presence of a strong hydrogen halide acceptor such as an alkali metal hydroxide. This apparently forms an intermediate alkali metal mercaptide. However, in case of a poor rate of reaction by this method, good results are obtained, when there is employed, a catalytic amount of both a source of cuprous ion and a nitrogenous base. The exact weight of such catalyst to be employed is not critical. The employment of such catalyst is in some cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. When a cuprous thiolate is employed as reactant, it suffices as cuprous material. Cuprous chloride itself or other cuprous salt may be employed. The employed weight is not critical, but may vary from a very small trace amount, less than 1/100 of 1 molar percent, to as much as an amount equimolecular with either reactant or even greater.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as a hydrocarbon oil.

In carrying out the reaction to prepare the compounds of the present invention, the halide and the thiol are intimately mixed and blended, in any order and in desired amounts, with either alkali metal hydrogen halide acceptor, or source of cuprous ion and nitrogenous base as hereinbefore described, and thereafter heated, to a temperature at which reaction takes place at a desired rate. In one convenient method of practicing the present method, the reaction temperature may be the reflux temperature of the liquid reaction medium. In this situation, heating may be continued at the boiling temperature of the reaction mixture and under reflux for a period of time to carry the reaction to completion. The reflux apparatus may be equipped with water trap.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons, and benzene. In any event, reaction product is extracted with solvent, the solvent extract dried over an inert drying agent such as, for example, anhydrous potassium sulfate or the like; the solvent vaporized and removed and the remaining product purified. For this it may be distilled in vacuum; alternatively, it may be chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—p-(Allylthio)Phenyl Phenyl Ether*

A reaction mixture is prepared, consisting of 20.12 grams (0.1 mole) of p-mercaptophenyl phenyl ether, 16 grams of cuprous oxide (technical grade) and 7.65 grams (approximately 0.1 mole) of 1-chloro-2-propene dispersed in a mixture consisting of 110 milliliters quinoline and 10 milliliters pyridine. The resulting reaction mixture is placed in a flask under reflux, the reflux being equipped with a water trap. In this situation, the reaction mixture is heated at its reflux temperature (a pot temperature between approximately 200 and 240° C.) for 2 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous potassium sulfate; the resulting liquid is warmed to vaporize and remove ether solvent and obtain a residual oil. This oil is redistilled, and is collected as a fraction boiling at 140° C. under 0.8 millimeter mercury pressure. The resulting p-(allylthio) phenyl phenyl ether is a colorless, oily liquid of refractive index 1.6067 for the D line of sodium light at 25° C. The product is highly effective as a veterinary anthelmintic but of very low toxicity to warm-blooded animals.

In similar procedures modified by inclusion, in the reaction mixture, of 0.2 gram (approximately 0.2 mole percent) of hydroquinone as polymerization inhibitor; and employing o-mercaptophenyl phenyl ether and vinyl chloride as reactants, there is obtained a non-polymeric o-(vinylthio)phenyl phenyl ether product.

*Example II.—m-(11-Dodecenylthio)Phenyl Phenyl Ether*

In procedures essentially similar to the foregoing except that the starting thiol is m-mercaptophenyl phenyl ether and the halide is 1-chloro-11-dodecene, there is prepared, in good yield, a solid, crystalline, non-polymeric m-(11-dodecenylthio)phenyl phenyl ether product. The compound usefully improved the lubricity of lubricating oils to which it is added.

*Example III.—p-(Allylthio)Phenyl Phenyl Ether*

A reaction mixture is prepared consisting of 20.5 grams (0.1 mole) of p-chlorophenyl phenyl ether, technical cuprous oxide dispersed in 130 milliliters technical 2,4-lutidine and 60 milliliters quinoline, as mixed liquid reaction medium. The resulting reaction mixture is heated, with stirring, at its boiling temperature and under reflux. To the heated mixture there is added, slowly, dropwise, and with stirring, 7.5 grams (a little over 0.1 mole) 2-propene-1-thiol, (allyl mercaptan). At the conclusion of the addition, heating at reflux and stirring are continued for several hours reaction time, the reflux condenser being equipped with a water separator. At the conclusion of the reaction time, the resulting hot mixture is poured directly into a mixture of chipped ice and excess (200 milliliters) concentrated hydrochloric acid. As a result of these procedures, the ice melts and a brown solid separates in the resulting aqueous dispersion. This solid is collected by filtration and a chloroform extract made of it. The chloroform extract is washed twice with 10 percent hydrochloric acid and then dried over anhydrous potassium sulfate. From the resulting dry chloroform solution, chloroform solvent is evaporated, leaving a residual oil. This oil is redistilled at subatmospheric pressure to obtain a colorless, oily liquid product of structure identical with that of the product of Example I, foregoing.

In methods similar to those of Example III, employing a halophenyl phenyl ether and an alkenyl mercaptan, the other products of the present invention are readily prepared.

In procedures essentially the same as either of the foregoing, by the use of appropriate starting materials, all the other products of the present invention are prepared.

Halophenyl phenyl ethers used as starting materials in the practice of the present invention are, for the most part, articles of commerce. However, those which are not can readily be prepared in known procedures such as, for example, the method of Suter and Green. See The Journal of the American Chemical Society, 59, page 2578 and following. Other methods are well known to those skilled in the art.

The alkenethiols to be used are also, for the most part, articles of commerce. They, also, can be prepared in known methods, such as the reaction of the corresponding alkenyl halide with an alkali metal hydrosulfide. (Journal of the Chemical Society (London) 10, 320 (1858).)

The mercaptophenyl phenyl ethers are variously prepared. In a convenient method, a suitable heteropolycyclic compound is cleaved, as by the action of an alkali metal. See, for example, the cleavage of phenoxathiin with sodium by Tomita et al., in the Journal of the Pharmacological Society of Japan, volume 72, pages 206–211.

I claim:

1. A compound corresponding to the formula

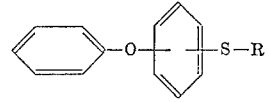

wherein R represents an alkenyl group being of from 2 to 12, inclusive, carbon atoms.

2. p-(Allylthio)phenyl phenyl ether.
3. m-(11-dodecenylthio)phenyl phenyl ether.

No references cited.